E. BROWN.
Hold-Back.
No. 48,513.  Patented July 4, 1865.
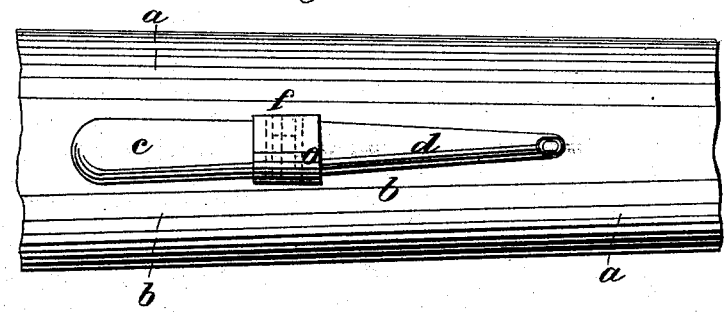
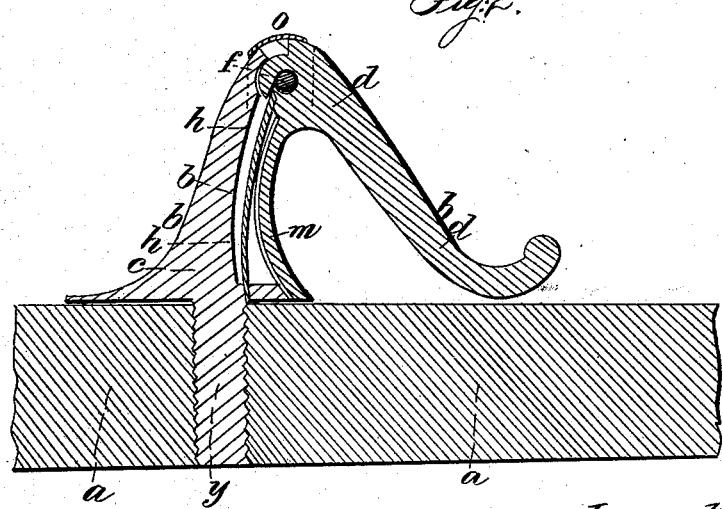
Witnesses
Albert W. Brown
Louis P. Rogers
Inventor
Edwin Brown
by his Att'y
Joseph Garell

UNITED STATES PATENT OFFICE.

EDWIN BROWN, OF LEOMINSTER, MASSACHUSETTS.

IMPROVEMENT IN BREECHING-HOOKS FOR VEHICLES.

Specification forming part of Letters Patent No. 48,513, dated July 4, 1865.

*To all whom it may concern:*

Be it known that I, EDWIN BROWN, of Leominster, in the county of Worcester and State of Massachusetts, have invented certain new and useful Improvements in Breeching-Hooks for Harnesses; and I do hereby declare that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

The present invention relates to certain new and useful improvements in breeching-hooks for harnesses, the principle object of which is to facilitate the detachment of the horse from the shafts in cases of accidents, the many advantages of which are evident. Many devices have heretofore been invented and patented for this purpose; but they have been so complicated and expensive in their manufacture as to forbid their general adoption, and, moreover, they were liable to clog, not only from corrosion, but from other obstruction of their parts.

Under the present invention a breeching-hook is obtained which fully answers the objects of its invention, and is so constructed as to prevent corrosion or clogging of its parts from moisture or any other cause.

The principal features of my improvements consist in forming the hook, made of a suitable shape, to be used for the ordinary purposes of a breeching-hook for harnesses in two parts attached together by a pivot-joint. One part of this hook—the standard—is then firmly screwed or fastened in any proper manner to the shaft, while the other, pivoted at one end to the same, is free to be turned to or from the shaft, according as it may be desired to insert or remove the breeching-strap from its hook. Thus while a stationary standard or bearing-point for the breeching-strap is secured for the said strap to pull or hold back upon when necessary, yet the strap acting against the swinging arm of the hook as the horse moves forward within the shafts, will easily slide under and unfasten itself from the hook, the advantages of which in facility of unharnessing and accidents are evident. I have also made other important improvements in detail in the said hook, which will be hereinafter more particularly described.

In the accompanying plate of drawings, to which reference will be hereinafter made by letters, Figure 1 is a plan or top view of my improved breeching-hook applied to a shaft, and Fig. 2 is a central longitudinal vertical section through the same.

*a a* in the accompanying drawings represent a portion of a vehicle's shaft. *b b* is the breeching-hook, made of the ordinary shape, but in two parts, *c* and *d*, which are hinged together at *f*, and one of which, *c*—the standard—is securely fastened to the shaft by means of a screw-rod, *y*, or in any other proper manner, while the other part, *d*, or swinging arm, is free to be turned on its hinges to or from the shaft at pleasure, according as it may be desired to insert the breeching-strap within the hook or to remove it therefrom. Against the standard *c* the breeching-strap acts, as in the ordinary breeching-hook, but in cases of accidents, or in unharnessing when it is desired to release the horse from the shaft, it is evident that the hook will open—the arm *d* turning upon its hinge *f*—by the simple forward movement of the horse within the shafts, thereby causing the instant disengagement of the breeching-straps from their hooks. In order, however, to more securely retain the swinging arm of the hook in its closed position when the strap is in the hook, and also to cause it to more readily close of itself after the hook has been opened, as described, I have attached thereto a spring, *h*, the other end of which is securely fastened in the groove *l* of the standard *c*, an arm, *m*, of the swinging arm *d* serving to protect the same from moisture and corrosion, and yet permit the easy removal of the spring, when desired, to insert a new one. This spring *h*, in lieu of being attached to the arm *d* and standard *c*, it is evident may be made of a spiral form and wound around the pivot of the hinge *f*, or it may be arranged in a variety of forms to accomplish the object of its use.

*o* is a cap or covering placed over the joint of the hinge *f* to prevent moisture, &c., from getting between the parts of the same, and thus obviate corrosion or obstruction.

Thus it will be seen from the above description that while a breeching-hook is secured which will accomplish the ordinary purposes of its use the breeching-strap can be instantly disengaged therefrom in case of accident, or in unharnessing, by the simple forward movement of the horse within the shafts, the advantages of which are manifest; and that also any corrosion or obstruction of the parts composing the same is entirely prevented, thus insuring its certain operation under all circumstances when desired.

What I claim as my invention, and desire to have secured to me by Letters Patent, is—

1. The construction of a breeching-hook by combining with a fixed standard a rigid hook swinging upon said standard, as described, so that the breeching-strap shall be released by the displacement of the hook, substantially as herein described.

2. In combination with a fixed standard and movable hook, a spring actuating the hook and located in relation to the hook and standard as described.

EDWIN BROWN.

Witnesses:
JOSEPH GAVETT,
ALBERT W. BROWN.